United States Patent [19]
Mutoh et al.

[11] 4,443,820
[45] Apr. 17, 1984

[54] PROCESS FOR PREPARING HECTOGRAPHIC PRINTING MASTERS

[75] Inventors: Masayuki Mutoh, Machida; Takanobu Ishidoh, Yokohama; Toshihiro Hayashi, Mitaka, all of Japan

[73] Assignee: Minolta Camera Kabushiki Kaisha, Osaka, Japan

[21] Appl. No.: 206,856

[22] Filed: Nov. 6, 1980

[30] Foreign Application Priority Data

Nov. 6, 1979 [JP] Japan ............................... 54-144028
Dec. 5, 1979 [JP] Japan ............................... 54-158583
Dec. 5, 1979 [JP] Japan ............................... 54-158584

[51] Int. Cl.³ ..................... H04N 1/22; G01D 15/18
[52] U.S. Cl. ..................................... 358/296; 346/75
[58] Field of Search .......................... 346/75; 358/296

[56] References Cited
U.S. PATENT DOCUMENTS

3,715,219 1/1973 Kurz et al. .
4,003,312 1/1977 Gunther .
4,183,030 1/1980 Kaieda et al. .

*Primary Examiner*—Donald McElheny, Jr.
*Attorney, Agent, or Firm*—Wenderoth, Lind & Ponack

[57] ABSTRACT

In order to take advantage of an ink jet generating unit for preparing hectographic printing masters, solid ink is proposed. The solid ink is prepared by dispersing dye stuff of more than 10 percent by weight in a hydrocarbon of the thermally dissoluble type. Various types of apparatuses each incorporating the ink jet generating unit are also provided.

12 Claims, 12 Drawing Figures

PROCESS FOR PREPARING HECTOGRAPHIC PRINTING MASTERS

BACKGROUND OF THE INVENTION

This invention relates to a hectographic printing process, and more particularly, to a process for preparing hectographic printing masters.

Hectographic printing is one of the conventional printing processes and is especially convenient when reproductions of more or less than one hundred sheets are required. In the hectographic process, a printing master is provided by depositing a sprit process ink on a suitable master substrate. More specifically, an original is delineated on ordinary paper (the master substrate) covered with a specific carbon tissue (coated with a sprit process ink) with a pencil, a typewriter and the like, thereby depositing the ink onto the rear surface of the master substrate. Alternatively, a thermal transferring process can be used for the above purpose. According to this method, heat radiation is applied to the carbon tissue superposed with such an original having thereon an original image colored in black, thus causing the ink to be deposited on the master substrate. Such hectographic printing master is then applied onto a paper for reproduction with the exertion of slight pressure. During such exertion, a dye included in the ink deposited on the master is dissolved into alcohol coated on the paper for reproduction. Thus, during each reproduction operation, a small amount of the ink from the master is deposited in an image configuration on the particular paper. Various kinds of sprit inks for such purpose have already been proposed. However, all of these inks have the disadvantage that the viscosity thereof is rather high. The typical ink comprises a vegetable wax, a dye such as a crystal violet and an oil, and such consequent ink ordinarily has a high viscosity such as some hundreds c.P. at 100° C. Since the hectographic process indispensably includes a step of depositing the sprit process ink on the rear surface of the master substrate as stated above, a troublesome manual step must be involved. Thus, the handling of the carbon tissue makes the operator's hands dirty. Further, since the sprit carbon tissue can not be reused, the hectograph inherently involves the disadvantage that it can not be accomplished at low cost. Also, in the case where the original is prepared by handwriting or by typographical writing, even consequent reproduction brought about by a thermal transferring process results a poor resolving power, in which the visual line density on the reproduction is at most two to three lines per millimeter.

To cope with these disadvantages, there may be considered the use of an ink jet generating unit. However, it has not been possible to find a hectographic ink suitable for such unit. Furthermore, when one of the conventional apparatuses for preparing printing masters is employed, the following requirement specific to hectographic printing masters must be taken into consideration.

That is, a conventional ink jet generating apparatus comprises a first drum on the circumference of which is wound the original, and a second drum on the circumference of which is wound recording paper. In accordance with the rotation of the first drum, a detecting means including, for example, a photoelectric element is adapted to correspondingly shift along the rotating axis of the first drum, thereby to scan the whole surface of the original. The second drum is also adapted to rotate in association with the rotation of the first drum, while a recording member with a needle electrode is also adapted to be shifted along the rotating axis of the second drum in a manner such that the image of the original is synchronously formed as a similarly oriented image on the recording paper. In adapting such apparatus to hectographic printing, the consequent recording paper bearing the image thereon would be used for the printing master. However, according to the hectographic printing process, a mirror image is required for the image on the recording paper, since the image carrying surface of the recording paper would be directly applied onto the paper for reproduction, with the ink forming the image configuration being deposited onto the paper for reproduction. Thus, when a hectographic printing master is prepared with such conventional apparatus, there must be further provided a specific signal storing circuit. Namely, such signal storing circuit must store signals of the image concentration of the original, and upon preparing the master the signals thus stored are adapted to be output in an opposite manner relative to the inputting succession thereof. Such being the case, in addition to the signal storing circuit, signal control circuit means is indispensable to control such input and output signals. Thus, the consequent apparatus including these appliances becomes quite expensive, with the construction thereof being quite complex.

SUMMARY OF THE INVENTION

Accordingly, an essential object of the present invention is to provide a process for preparing hectographic printing masters, which can take advantage of a recording apparatus incorporating an ink jet generating unit.

Another important object of the present invention is to provide such process for preparing hectographic printing masters as described above, which can be performed at low cost.

A further object of the present invention is to provide such process for preparing hectographic printing masters as described above, which overcomes all the disadvantages inherent in the prior arts, and specifically as described in the foregoing.

In accomplishing these and other objects according to one preferred embodiment of the invention, there is provided a process for preparing hectographic printing masters. The process comprises the step of preparing an ink for use in an ink jet generating unit, the step of thermally dissolving such ink, the step of depositing the ink in image configuration on a master substrate by selectively discharging the ink from the unit as droplets in accordance with detected original image information, and the step of cooling the ink deposited on the master substrate, thereby to allow it to be solidified, wherein the ink is prepared by dispersing dye stuff of more than 10 percent by weight in a hydrocarbon substance of the thermally dissoluble type. Further, the ink is adapted to have a volume resistance within a range of $10^7$ to $10^{10} \Omega \cdot cm$ and a viscosity within the range of 3 to 20 c.P., when the ink is being discharged onto the master substrate as droplets. An apparatus for carrying out the above process comprises a first drum having wound therearound an original image sheet, a second drum having wound therearound a recording sheet, means for causing the first and second drums to rotate relatively oppositely with respect to each other about respective longitudinal axes thereof, means for detecting image concentration of the image on the original sheet to output signals each indicative of such information, means for recording an image relatively corresponding to the original image in response to such signals as imparted from the detecting means, means for effecting respective relative movements between the first drum and the detecting means and between the second drum and the recording means, with such respective relative movements being in the same direction. The ink jet generating unit included in the recording means is of the electrostatic induction type.

As is clear from the description in the foregoing, the ink of the invention readily can be employed for the ink jet generating unit with the result of providing satisfactory issuing and interrupting characteristics of the ink jet. Accordingly, the ink jet generating unit can deposit the ink in image configuration on the master substrate in quite a precise manner in accordance with an original image pattern intelligence. The consequent image on the substrate is a very representative image of the original. Further, such apparatus to prepare printing masters is especially characterized by being of quite simplified construction and by being able to form a mirror image of the original on the master substrate.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted here that like parts are designated by like reference numerals throughout the several views of the accompanying drawings.

DETAILED DESCRIPTION OF THE INVENTION

Figure 1:
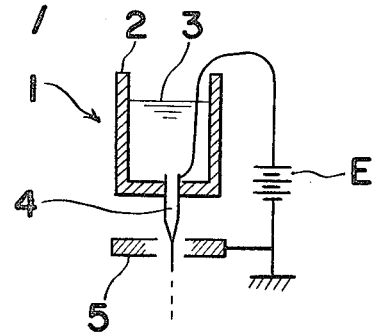
FIG. 1 is a view schematically embodying a construction of an ink jet generating unit of the electrostatic jetting type.

Referring now to FIG. 1, there is shown a schematic view of the construction of an ink jet generating unit of the electrostatic jetting type, which may be employed in carrying out the present invention. The ink jet generating unit 1 comprises an ink tank 2 for containing therein a substantial amount of electrically-conductive ink 3, a nozzle 4 connected to the ink tank 2, through which a series of fine droplets are jetted from the ink tank 2 towards the recording medium (not shown here), a ring shaped electrode 5 supported in position in spaced relationship to the nozzle 4, and means E connected to the nozzle 4 and the ring shaped electrode 5 for applying a voltage between the nozzle 4 and the ring shaped electrode 5 for establishing an electric field between the nozzle 4 and the ring shaped electrode 5. The ink 3 introduced into the nozzle 4 is adapted to initially form a meniscus of ink at the nozzle tip by applying a bias voltage from the source of bias voltage (not shown here). In accordance with application of a sufficient voltage between the ring shaped electrode 5 and the nozzle 4 with the high voltage power source E, there is effected an electric field which has a sufficient intensity and is symmetrical with respect to the center of the nozzle for causing extremely fine ink droplets to travel straight from the nozzle 4 and which has a strength sufficient to cause the ink to be drawn out of the nozzle 4 due to the field alone.

When such ink jet generating unit as stated above is introduced into a hectographic printing process to prepare a printing master, conventional sprit process ink can not be used. The conventional sprit process ink ordinarily has a high viscosity such as some hundreds c.P. at 100° C. This is due to the fact that according to the hectographic printing process, a small amount of the dye included in the ink forming an image on the master must be dissolved into alcohol coated on a paper for reproduction during each reproduction operation, thereby causing such small amount of ink to be transferred onto the paper for reproduction.

Figure 2:
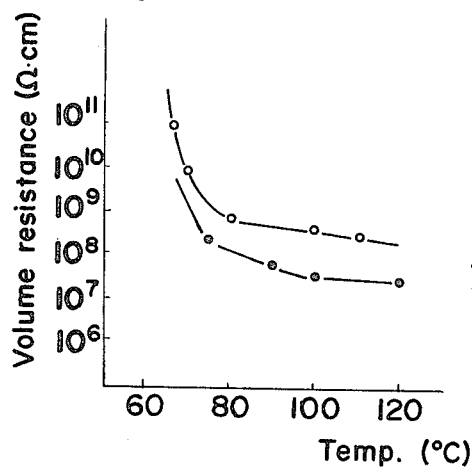
FIG. 2 is a graph illustrating the volume resistance of an ink for use in the unit shown in FIG. 1 as a function of temperature, with the composition of the ink being variable.
Figure 3:
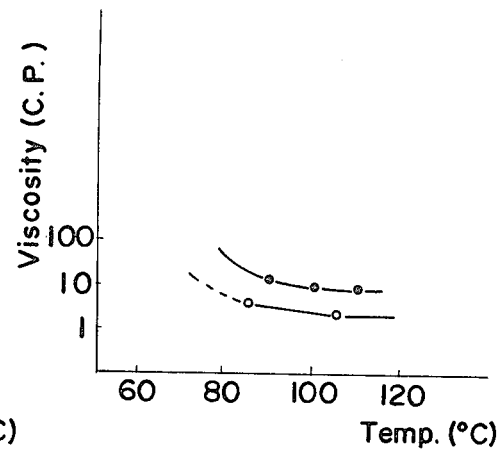
FIG. 3 is a graph illustrating the viscosity of the ink shown in FIG. 2 as a function of temperature, with the composition of the ink being variable.

In view of the drawback of the conventional sprit process ink employed in the process of the present invention, the ink is prepared with a hydrocarbon containing therein a dye of more than 10 percent by weight in a dispersed state, in which the hydrocarbon is of the thermally dissoluble type and can dissolve in alcohol at less than 10 percent. For example, such hydrocarbon may be one of the paraffinic hydrocarbons. This ink is a solid at room temperature. However, once the ink is heated, it becomes liquefied and is applicable with the ink jet generating unit of the above described type. Soon after such ink is deposited as image fluid particles on a master substrate, such particles become solidified on the master substrate, thus effecting a printing master. Referring now to FIGS. 2 and 3, there are shown respective graphs of the volume resistance and the viscosity of inks in accordance with the present invention as a function of temperature, for different compositions of the ink. Two kinds of solid inks having different compositions with respect to each other are prepared. These two inks include a crystal violet as the dye. One of the inks contains a paraffinic hydrocarbon having a low melting point relative to the remainder of the ink in the ratio of one to one by weight percent, while 25 percent by weight of the dye is included in the ink. The other ink contains the paraffinic hydrocarbon of the above described type relative to the remainder of the ink in the ratio of one to two by weight percent, with 15 percent by weight of the dye being included in the ink. In these graphs, the plot with white dots represent the results with the former ink, while the plots with black dots represent the results with the latter ink. As is shown in these graphs, when the heating temperature is in the range of 90° to 100° C., both of these inks have volume resistances ranging from $10^7$ to $10^{10} \Omega \cdot cm$ and viscosities ranging from 3 to 20 c.P., respectively. These ink properties are preferable to achieve satisfactory dispersing characteristics when such inks are employed in the ink jet generating unit. Accordingly, if these inks are used, the ink jet generating unit can deposit the ink in image configuration on the master substrate in quite a precise manner in accordance with an original image pattern intelligence. The consequent image on the substrate is a very representative image of the original image. Further, the present inventors have already confirmed that inks having the following compositions can show respective improvements in the dispersing characteristics of the dye and in the viscosity characteristics of the inks.

(EXAMPLE I)
Composition:

| Wax | mineral wax of 40% by weight |
| --- | --- |
|  | oxidizing wax of 10% by weight |
| oil | 22.5% by weight |
| surfactant | 2.5% by weight |
| dye | crystal violet of 25% by weight |

Property:

| viscosity | 7 c.P. at 100° C. |
| --- | --- |
| volume resistance | $1.8 \times 10^8 \Omega \cdot cm$ |

(EXAMPLE II)
Composition:

| Wax | mineral wax of 44% by weight |
| --- | --- |
|  | vegetable wax of 1% by weight |
| oxidizing wax of 5% by weight |  |
| oil | 22% by weight |
| surfactant | 3% by weight |
| dye | crystal violet of 25% by weight |
| viscosity | 7c.P. at 95° C. |
| volume resistance | $1.5 \times 10^8 \Omega \cdot cm$ |

The ink preferable for use in the ink jet generating unit has a volume resistance ranging from $10^8$ to $10^9 \Omega \cdot cm$ and a viscosity ranging from 3 to 7 c.P. at 100° C.

Figure 4:
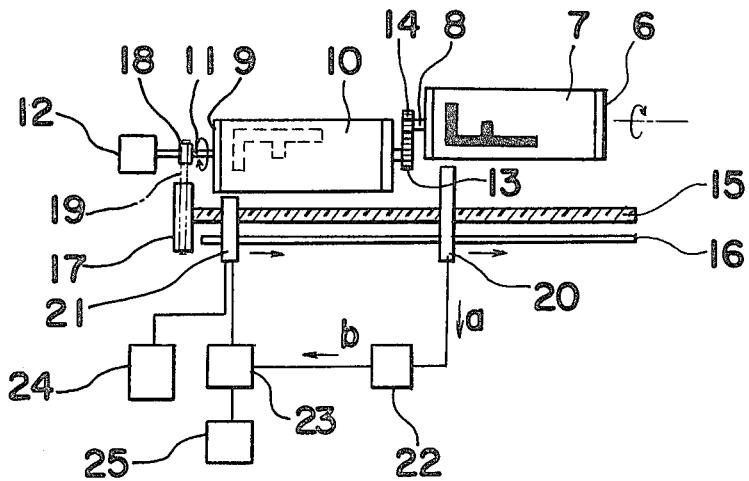
FIG. 4 is schematic, side view of an apparatus for use in preparation of hectographic printing masters in accordance with one preferred embodiment of the present invention.

Referring now to FIG. 4, there is shown a schematic, side view of an apparatus for use in preparation for hectographic printing masters in accordance with one preferred embodiment of the present invention. The apparatus comprises a first drum 6 having wound thereon an original sheet 7 and a second drum 9 having wound thereon a recording paper 10 (the substrate of the master). Both the first and second drums 6 and 9 are adapted to permit the respective original sheet 7 and recording paper 10 to be attached thereto or to be detached therefrom easily. The first drum 6 has the same diameter as that of the second drum 9. The first drum 6 is rotatable with respect to a substantially horizontal shaft 8, while the second drum 9 is adapted to be rotatable with respect to a horizontal shaft 11. One end of the shaft 11 is connected to an electric motor 12, while at the other end, a gear 13 is mounted. The gear 13 is adapted to mesh with a gear 14, which is mounted on one end of the shaft 8. Due to such meshing arrangement of the gears 13 and 14, the drums are rotatable relatively oppositely at the same rotating speed with respect to each other. Further, the apparatus is provided with a threaded rod 15 and a guide rod 16, both of which extend parallel to shafts 8 and 11. A chain sprocket wheel 17 is mounted on one end of the threaded rod 15 in a manner such that it can cooperate with a chain sprocket wheel 18 mounted on the shaft 11 by means of a chain 19. Thus, the threaded rod 15 can be rotated in accordance with the rotation of the chain sprocket wheel 18. On threaded rod 15 and guide rod 16, a photoelectric detecting means 20 and a recording head 21 are provided in a manner such that they can be shifted at the same speed in the same direction in accordance with the rotation of the rod 15. The respective front heads of the detecting means 20 and the recording head 21 are spaced apart from circumference of the corresponding drums' by respective appropriate distances. The photoelectric detecting means 20 is conventional one and, includes a light source (not shown) and a photoelectric member. The photoelectric detecting means 20 generates a series of electric signals indicative of the image concentration on the original sheet 7 in accordance with its scanning operation along the drum 6. The signals (a) thus generated are successively applied to an amplification circuit 22, thereby to cause them to be amplified. The amplified signals (b) are further applied successively to a high voltage switching circuit 23. The high voltage switching circuit 23 is connected to a high voltage power source 25. The temperature of the ink supplied to the recording head 21 is controlled by a temperature compensating circuit 24.

By the arrangement as stated above, in accordance with the drive of the motor 12, the drums 6 and 9 are rotated oppositely with respect to each other, with both of the detecting means 20 and the recording head 21 being moved along the respective shafts 8 and 11 in the rightward direction in FIG. 4. The original 7 is scanned in accordance with such movement of the detecting means 20, and therefore the detecting means 20 sequentially generates signals each indicative of an image concentration on the original sheet 7. By way of example, when the photoelectric detecting means 20 scans a dark portion on the original sheet 7, a signal (a) of large magnitude is output, and then the high voltage switching circuit 23 is electrically actuated through the amplification circuit 22. Since the operation of the high voltage switching circuit 23 permits application of high voltage between the nozzle 4 (see FIG. 1) of the recording head 21 and its facing electrode 5 through the high voltage power source 25, the ink is jetted and then, is deposited on the master substrate 10. On the other hand, when the photoelectric detecting means 20 scans a white portion on the original sheet 7, a signal (a) of the small magnitude is correspondingly output. Such being the case, since the high voltage switching circuit 23 is not electrically actuated, the ink can not be ejected from the recording head 21. Depending upon such jetting operation as described above, the original image can be formed on the master substrate 10, and thus a corresponding printing master is produced. According to the embodiment described above, although both of the means 20 and the head 21 are moved at the same velocity in the same direction, the image formed on the master substrate 10 is a mirror image of the original.

This is due to the fact that the respective rotating directions of drums 6 and 9 are mutually opposite.

When a rotary press incorporating such hectographic master is operated, a paper for reproduction can have thereon an image corresponding to the original image. More specifically, in the operation of the hectographic printing process, the printing master 10 is applied onto the paper for reproduction with the exertion of slight pressure. During such exertion, a small amount of the ink deposited on the printing master is dissolved into the alcohol coated on the paper for reproduction during each reproduction operation, and thus is transferred onto the paper for reproduction. In the operation of the hectographic printing process in accordance with the invention, the consequent reproduction was at a resolving power of five lines per millimeter under the following conditions. Namely, the rotational speed of the drums 6 and 9 was 3000 r.p.m., when the printing master was prepared. Further, the shifting speed of the photoelectric detecting means 20 and the recording head 21 was 1 mm/sec in the horizontal direction.

Figure 5:
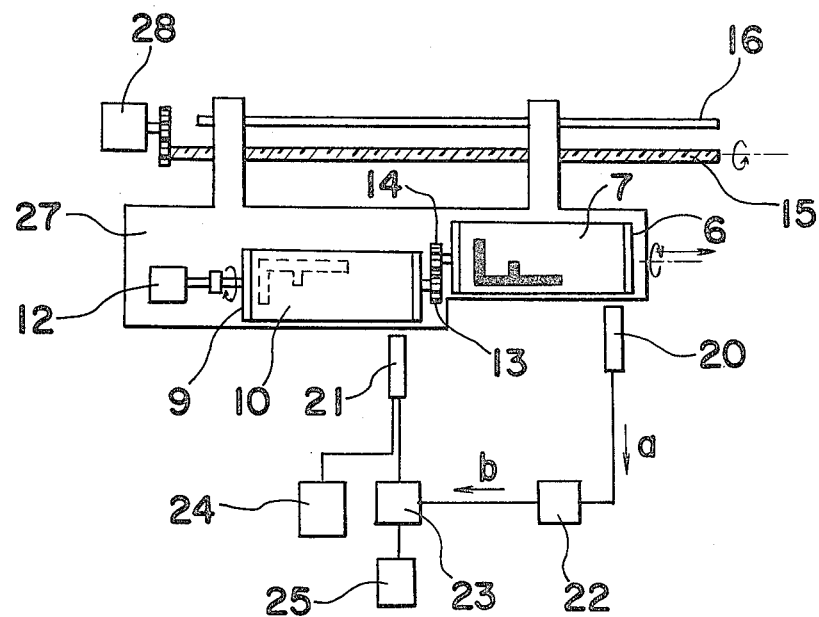
FIG. 5 is a view similar to FIG. 4, particularly showing one modified embodiment of the apparatus.

Referring now to FIG. 5, there is shown a modified embodiment of the apparatus shown in FIG. 4. However, like parts are not detailed here for the sake of brevity. The drum 6 and the drum 9 are connected with the meshing arrangement of the gears 13 and 14. Thus, in accordance with the drive of the electric motor 12, drums 6 and 9 rotate relatively oppositely at the same rotating velocity. However, according to this modified embodiment, drums 6 and 9 and the electric motor 7 are integrally mounted on a retaining board 27. The retaining board 27 is movably supported in position with the threaded rod 15 and the guide rod 16 in a manner such that it can be moved in the axial direction of drums 6 and 9. The photoelectric detecting means 20 and the recording head 21 are adjacently spaced apart from the corresponding drums 6 and 9, thereby to cause them to scan respective surfaces of drums 6 and 9. A numeral 28 designates an electric driving motor for rotating the threaded rod 15. By the arrangement of this modified embodiment, when the electric driving motors 28 and 12 are energized, the retaining board 27 is moved rightwardly, with a mirror image being formed on the master substrate in almost the same manner as described earlier.

Figure 6:
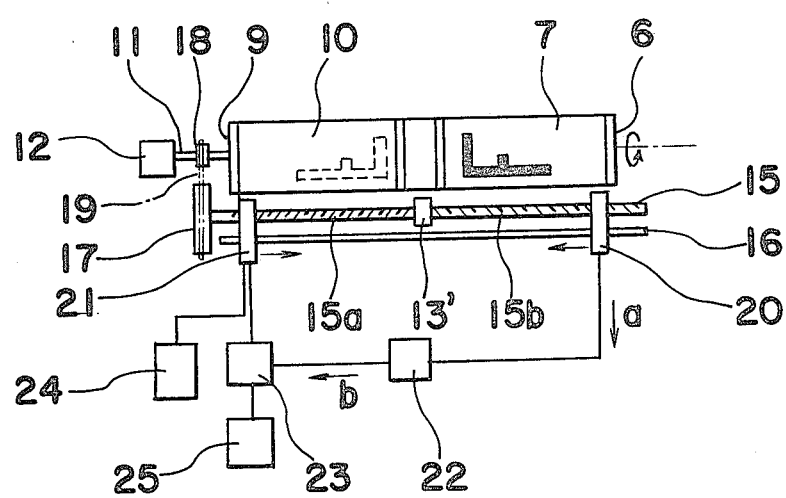
FIG. 6 is view similar to FIG. 4, particularly showing another modified embodiment of the apparatus.

Referring now to FIG. 6, there is shown a further modified embodiment of the apparatus shown in FIG. 4. However, according to this embodiment, the drum 6 and the drum 9 are provided as one unit. The consequent unit is rotatable with respect to the shaft 11 or the longitudinal axes of drums 6 and 9. The driving motor 12 is mounted on one end of the shaft 11, while the sprocket 18 is mounted on the shaft 11 so as to be interposed between the driving motor 12 and the unit. Similar to the embodiments shown in FIGS. 4 and 5, the apparatus is also provided with the threaded rod 15 and the guide rod 16, both of which are spaced from and extend parallel to the common shaft of the drums 6 and 9. However, the threaded rod 15 consists of two portions (15a) and (15b) which are threaded relatively reversely with respect to each other. These reversely threaded portions (15a) and (15b) are separated from the other on the rod 15 by a joint 13'. Needless to say, the photoelectric detecting means 20 is mounted on the threaded portion 15b and the guide rod 16, whereas the recording head 21 is mounted on the other threaded portion 15a and the guide rod 16. The other structural feature of this embodiment is substantially the same as are shown in FIG. 4. By the arrangement as described above, in accordance with the revolution of the driving motor 12, not only the drums 6 and 9 are rotated as one unit, but also the means 20 and the head 21 are moved. Differing from all of the embodiments described in the foregoing, means 20 and the head 21 are relatively moved at the same velocity toward or away from each other. In spite of the fact that the drums 6 and 9 are rotated as one unit in one direction, the consequent image on the master substrate is a mirror image, since the means 20 and the head 21 are adapted to be moved in opposite directions.

Figure 7:
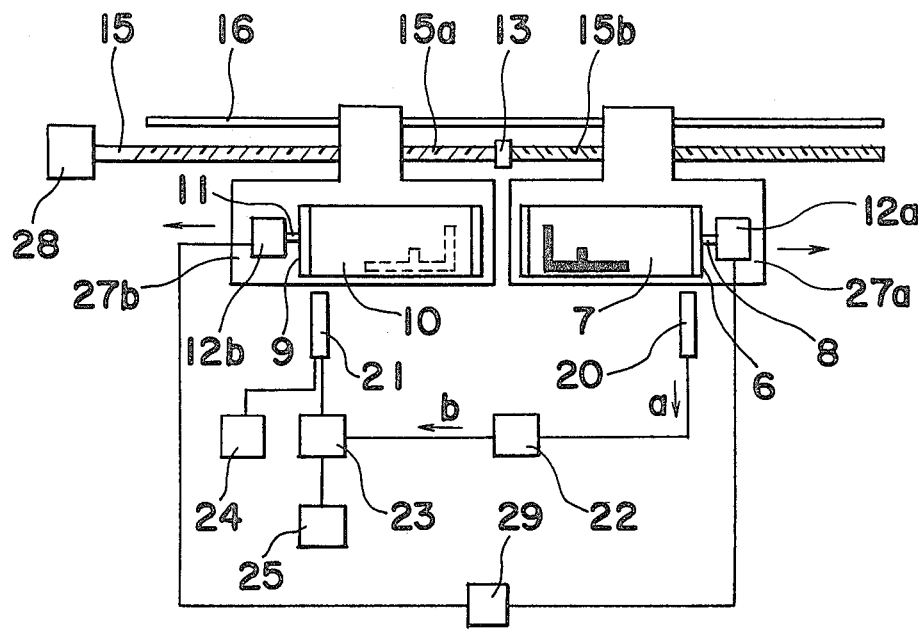
FIG. 7 is a view similar to FIG. 5, particularly showing one further modified embodiment of the apparatus.

Referring now to FIG. 7, there is shown a further modified embodiment of the apparatus shown in FIG. 5. According to this embodiment, the drum 6 is adapted to be rotatable with respect to its longitudinal shaft 8, since a driving motor 12a is mounted on one end of the shaft 8. Both the drum 6 and the driving motor 12a are integrally mounted on a retaining board 27a. The retaining board 27a is movably supported in position with the threaded portion 15b and the guide rod 16 in a manner such that it can be moved in a direction of the longitudinal axis of the drum 6 in accordance with the rotation of the threaded rod 15. Similar to the embodiment shown in FIG. 6, the threaded rod 15 of this embodiment is also divided into two portions 15a and 15b which are threaded relatively reversely with respect to each other. The drum 9 is adapted to be rotatable with respect to its longitudinal shaft 11, as a driving motor 12b is mounted on one end of the shaft 11. Both the drum 9 and the driving motor 12b are integrally mounted on a retaining board 27b. The retaining board 27b is movably supported in position by the threaded portion 15a and the guide rod 16 in a manner such that it can be moved in a direction of the longitudinal axis of the drum 9 in accordance with the rotation of the threaded rod 15. Further, the electrical circuit for this embodiment is the same as that provided for the embodiment shown in FIG. 6. However, both the photoelectric detecting means 20 and the recording head 21 are disposed adjacent to the corresponding drums 6 and 9 in a known manner. The threaded rod 15 is rotated through the energization of the driving motor 28. Respective rotations of the driving motor 12a and 12b are controlled by a control circuit means 29. By the arrangement stated above, the drums 6 and 9 are rotationally moved at the same speed in the same direction by the driving motors 12a and 12b, which are controlled by means of the control circuit means 29, with the threaded rod 15 being simultaneously rotated by the driving motor 28. In accordance with the rotation of the threaded rod 15, the respective retaining boards 27a and 27b are moved at the same velocity but in opposite directions. Accordingly, due to such relative movement of retaining boards 27a and 27b with respect to the means 20 and head 21 which are fixedly disposed, a mirror image of the original image can be formed on the master substrate 10.

Figure 8:
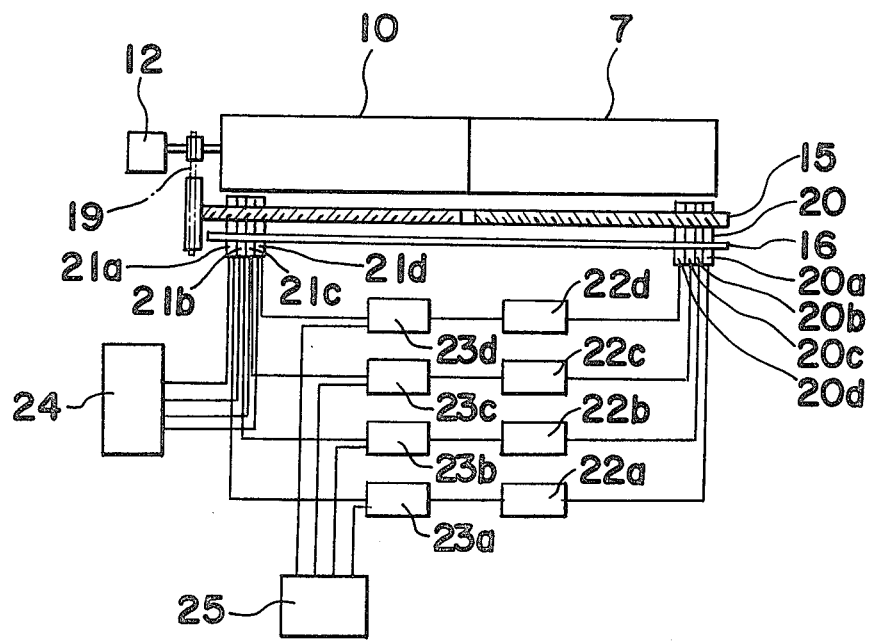
FIG. 8 is a view similar to FIG. 6, particularly showing a still further modified embodiment of the apparatus.

Referring now to FIG. 8, there is shown a still further modified embodiment of the embodiment shown in FIG. 6. However, this embodiment can especially prepare hectographic printing masters for use in color printing. The recording head 21 consists of four ink jet generating units 21a to 21d, while the photoelectric detecting means 20 correspondingly consists of four photoelectric detecting elements 20a and 20d, respectively. For example, the three photoelectric detecting elements 20b to 20d are preferably provided with respective red, green and blue filters, while the photoelectric detecting element 20a is provided with a black filter and has a spectral luminous efficiency distribution. Furthermore, the inks used for the respective ink jet generating units 21a to 21d are black, cyan, magenta, and yellow, and these are contained in respective ink tanks of the units. Thus, each of the units is adapted to discharge the corresponding coloring agent onto the master substrate in response to the signal carrying thereon the specific color information, so that the image corresponding to the original colored image can be precisely formed on the master substrate.

All of the five embodiments of the apparatus for carrying out the present process are roughtly divided into two kinds. Namely according to the embodiments shown in FIGS. 4 and 5, the apparatus comprises the first drum having wound therearound the original sheet, the second drum having wound therearound the recording sheet, means for making the first and second drums be rotated relatively oppositely with respect to each other, with respective drums being adapted to be rotated with respect to their own longitudinal axes, means for detecting image concentration of the image on the original sheet to output signals each indicative of such information, means for recording an image relatively corresponding to the original image in response to such signals from the detecting means, and means for effecting respective relative movements between the first drum and the detecting means and between the second drum and the recording means, with such respective relative movements being in the same direction. However, according to the respective embodiments shown in FIGS. 6, 7 and 8, the apparatus comprises the first drum having wound therearound the original sheet, the second drum having wound therearound the recording sheet, means for making the first and second drums be rotated in the same direction with respect to each other, with respective drums being adapted to be rotated with respect to their own longitudinal axes, means for detecting image concentration of the original image on the original sheet to output signals each indicative of such information, means for recording an image relatively corresponding to the original image in response to such signals from the detecting means, and means for effecting respective relative movements between the first drum and the detecting means and between the second drum and the recording means, with such respective relative movements being in opposite directions. Accordingly, any one of these apparatuses can dispense with the need for the provision of a signal circuit and the like, and further is characterized by a quite simplified construction to form a mirror image of the original image on the master substrate.

Figure 9:
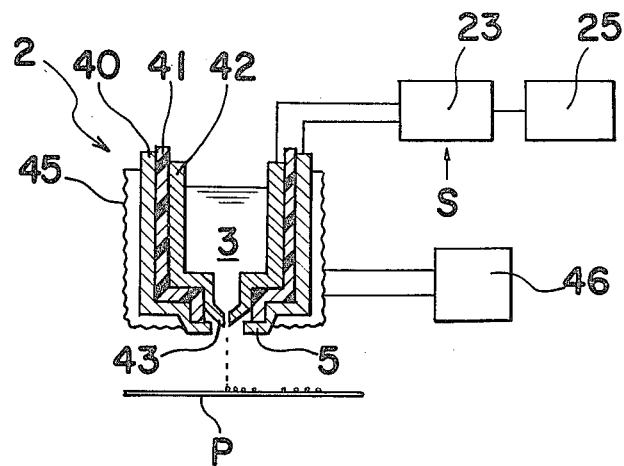
FIG. 9 is a schematic diagram showing an embodiment of a temperature compensating means which can be employed in the ink jet generating unit for use in accordance with the present invention.

Referring now to FIG. 9, there is shown a schematic diagram of a temperature compensating means which can be employed in the ink jet generating unit used in accordance with the invention. The recording head 21 of the ink jet generating unit is provided with an ink tank 42, which is incorporated in an outer container 40 lined with a layer 41 of a boron nitride. Such layer of boron nitride renders a high heat conductivity as well as an electric insulating character. Furthermore, as can be seen in FIG. 9, the ink tank 42 is centrally opened to define a conduit portion with a converging tip 43 extending downwardly, with the inner diameter of the converging tip, i.e. the nozzle 4, is adapted to be 150 micron. Similarly, the outer vessel 40 is also centrally opened in a manner such that an annular periphery thereof can define the ring shaped electrode 5 supported in position in spaced relationship to the nozzle 4 and having an inner diameter of 4 mm on the recording paper (P) side. A winding of heating means 45 of sheet-like type is firmly applied on the outermost circumference of the outer vessel 40, thereby to thermally control the temperature of the ink 3. The respective ink tank 42 and outer vessel 40 are electrically connected to the high voltage power source 25 through the circuit 23 for generating the signal of the high voltage type. As described earlier, in accordance with the types of signals generated by the photoelectric detecting means 20, the high voltage switching circuit 23 is electrically actuated to output ON-OFF signals, which are impressed upon the high voltage power source 25 so that a high voltage of 1.5 to 1.8 KV can be impressed between the nozzle 43 and the electrode 5.

Solid ink is supplied in the tank 42 and is heated up to a temperature of about 100° C. by the heating means 45, thereby to change it into a liquid ink. On the other hand, as described earlier, the winding of the master substrate P is provided around the drum 9, while the winding of the original sheet is provided around the drum 6. In accordance with the drive of the electric driving motor 12, such lines, figures, characters and the like delineated on the original sheet are read out by the photoelectric detecting means 20, thus causing image signals (S) to be output. In response to the application of such switching voltage of about 1.5 to 1.8 KV between the electrode 5 and the nozzle 43, there is effected an electric field. The electric field has sufficient strength to cause the ink to be drawn out of the nozzle 43 in the form of a thin thread due to the field alone. Furthermore, the electric field has sufficient intensity and is symmetrical with respect to the center of the nozzle 43 for causing the leading portion of the jet to be split in sequence into fine ink droplets. Soon after such ink is deposited on the master substrate P as image fluid particles in synchronization with the detecting operation, these particles become image residues on the master substrate. When the feed spacing of the particles is determined as five lines per mm along the longitudinal axis of the recording drum, a printing master having thereon the image delineated by lines each having a line width ranging from 0.1 millimeter to 70 or 90 micron can be prepared with the original having dimensions of 297 millimeter×210 millimeter within five minutes. Such being the case, in accordance with a moderate decrease in the viscosity of the ink, the hectographic printing master can be prepared in much shorter operating time. Further, when the feed spacing is much smaller, the resolving power can be improved to ten lines per millimeter. As described earlier, the printing master thus prepared is closely attached onto the outermost circumference of a conventional rotary press, and then such printing master is applied onto the paper for reproduction with the exertion of slight pressure, while the paper is impregnated in advance with a small amount alcohol such as methyl alcohol, ethyl alcohol etc. by a small During such exertion, a small amount the dye (crystal violet) included in the ink deposited in the image configuration on the printing master is transferred onto the paper during each reproduction operation and then is dissolved into the alcohol coated on the paper, thus forming a reproduction having thereon a luminous image in violet. With respect to the alcohol for use in the transferring step, a higher alcohol having a low melting point such as octadecanol, hexadecanol etc., and able to permit the dye to be dissolved to a considerable amount is not preferable for a vehicle, since the dye once dissolved in such alcohol can hardly be separated out.

Since the original image is formed on the master substrate by an ink jet generating unit, the mirror image of ink is clearly deposited in image configuration on the master substrate, whereby the consequent master is capable of printing more than 200 to 300 reproductions. Furthermore, the ink 3 contained in the ink tank 42 is solidified if the electrically heating appliance 45 is cut off. Thus, once the heating appliance is electrically cut off, the invasion of dirt through the tip of the nozzle 43 can be effectively prevented in accordance with the solidification of the ink, which dirt otherwise causes clogging and jamming of the nozzle 43. On the other hand, the ink thus solidified in the vicinity of the nozzle 43 is easily liquefied by heating by again activating the appliance 45.

Figure 10:
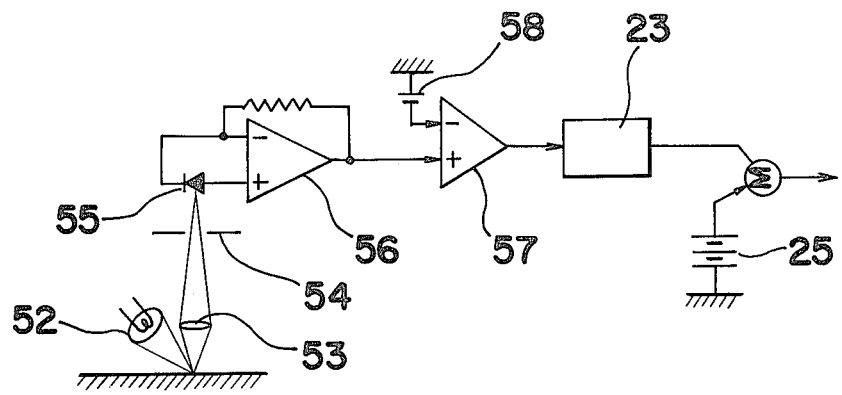
FIG. 10 is a schematic block diagram showing circuitry to generate a high voltage signal through which the initiation and interruption of the ink jet with the ink jet generating unit is controlled.
Figure 12:
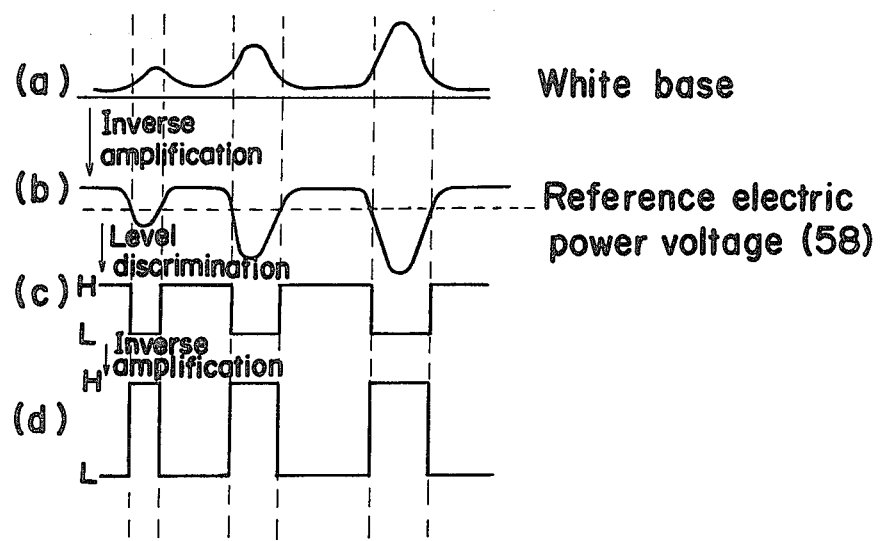
FIG. 12, including a–d, is a chart showing waveforms of signals appearing the circuit of FIG. 10 and which are shown in time relation to each other.

Referring now to FIG. 10, there is shown a schematic block diagram of a circuit to generate the high voltage signal, through which the initiation and interruption of the ink with the ink jet generating unit is controlled. The circuit comprises a light source 52, an image focusing lens 53, a pin-hole board 54, a silicone photodiode 55, an analog amplifier 56, an analog comparator 57, a reference electric power source 58, switching means 23 of high voltage type, and the electric source 25 of high bias voltage type. The photodiode 55 outputs such signals as shown in FIG. 12(a) in response to the difference in the image concentration on the original. Such output from the photodiode 55 is amplified by the analog amplifier 56 as shown in FIG. 12(b) and then, the results are further input into the analog comparator 57 with the reference electric power source 58. The output from the analog comparator 57 is shown in FIG. 12(c). In accordance with the type of signals output from the analog comparator 57, the switching means 23 of high voltage type is actuated to be in the ON or OFF mode, thereby to effect signals of the high voltage type as shown in FIG. 12(d). The signals as shown in FIG. 12(d) are impressed between the nozzle 43 and the electrode 5 so that the issuance and interruption of the ink by the unit can be correspondingly controlled by the detection.

Figure 11:
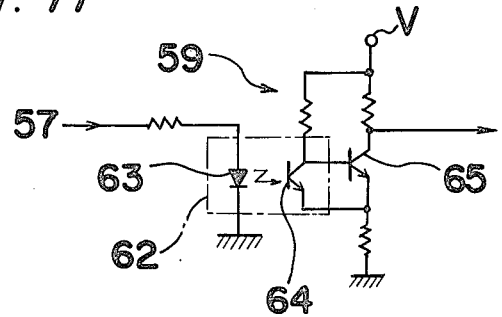
FIG. 11 is a circuit diagram which illustrates a high voltage switching means for use in accordance with the present invention.

FIG. 11 illustrates a switching means 59 of the high voltage type in accordance with one preferred embodiment of the present invention. The switching means 59 comprises a photocoupler 62 including a light emitting diode 63 and a phototransistor 64, a high voltage power source V, a transistor of the high voltage withstanding type 65 and resistors. The output from the comparator 57 is applied to the photocoupler 62. In a case where the output signal from comparator 57 is "LOW", since the light emitting diode 63 is not lit, with the phototransistor 64 being rendered OFF, the transistor 65 of the high voltage withstanding type is ON. Such being the case, a voltage of about 800 V, i.e. $R_2 V_H/(R_1//R_3)+R_2$, is impressed between the nozzle 43 and the ring electrode 5, in which case the issuance of ink from the nozzle does not occur. On the other hand, when the output signal is "HIGH", the light emitting diode 63 is first lit, with the following function of the circuit being sequentially effected. Namely, in accordance with such actuation of the light emitting diode 63, the phototransistor 64 is ON and then, the transistor 65 of the high voltage withstanding type is OFF. Accordingly, the output signal from the switching means 59 becomes the voltage ($V_H \simeq 1600$ V) of the high voltage power source, thus effecting the issuance of the ink from the nozzle 43.

According to the method as described in the foregoing, the photoelectric detecting results are treated in the digital processing mode, to synchronously record them on the master substrate. Therefore, in accordance with the detection of image areas and non-image areas, the issuance and interruption of the ink jet is adapted to be correspondingly brought about. However, such method does not permit an image having a middle tone on the original to be reproduced. In accomplishing this object, the image concentration on the original is adapted to be transformed into analog processing signals by converting the switching means 23 in the circuit into an amplifier of the high voltage type, while the output from the amplifier of the high voltage type is adapted to be appropriately variable.

For the preferable printing process, any dye can be used, as long as such dye has a composition suitable for ink for use in the ink jet generating unit. More specifically, as for cyan, methylen blue FZ (C.I. basic blue 9) is preferable, while as for magenta, orient basic magenta (C.I. basic violet 14) is preferable. As for yellow, oramin O-125 (C.I. basic yellow 2) is preferable. For the mono-color printing process, as for violet, C.I. basic violet 1 and 3 including methyl violet, B B, crystal violet, hectoviolet or the like are preferable.

Although the present invention employs an ink jet generating unit of the electrostatic induction type other types can be employed depending on the particular circumstances.

As is clear from the description in the foregoing, the ink of the invention is prepared by heterogeneously dispersing a dye stuff at more than 10 percent by weight in a hydrocarbon, which is of the thermally dissoluble type and which is capable of being dissolved in an alcohol at less than 10 percent by weight. Such ink of the invention can be readily liquefied through the thermal treatment thereof and therefore, an ink jet generating unit can be employed in preparation of a hectographic printing master. In accordance with such possible introduction of the unit into the hectographic process, various drawbacks inherent in the conventional art for preparing hectographic printing masters are effectively overcome.

Although the present invention has been fully described by way of example with referece to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A process for preparing a hectographic printing master suitable for use in a hectographic printing process of the type wherein the printing master is applied under slight pressure to sheets of reproduction paper previously impregnated with alcohol, and during each printing operation a small amount of ink deposited in image configuration on the printing master is transferred to the respective sheet by being dissolved in the alcohol therein, thereby forming a reproduction of the image, said process comprising:

dispensing more than 10 percent by weight of a dye stuff in a hydrocarbon of the thermally dissoluble type, thereby forming an ink which is solid at room temperature and liquid at an elevated temperature and which is capable of being dissolved bit-by-bit in the alcohol of sheets of hectographic reproduction paper, thereby being suitable for use in hectographic printing, and which is capable when in liquid form of being discharged as fine droplets by an ink jet generating unit;

heating said ink to said elevated temperature and thereby causing said ink to be in liquid form;

detecting an original image configuration;

depositing said ink on a master substrate by discharging from an ink jet generating unit said ink in liquid form as droplets in accordance with said detected original image configuration; and cooling the thus deposited ink, and thereby forming on said master substrate an image configuration of solidified ink in a form suitable thereafter for use in the hectographic printing of a plurality of reproductions of said original image.

2. A process as claimed in claim 1, wherein said ink jet generating unit is of the electrostatic induction type.

3. A process as claimed in claim 1, wherein when said ink is discharged onto said master substrate as droplets, said ink in liquid form has a volume resistance within a range of $10^7$ to $10^{10}$ $\Omega.cm$ and a viscosity within the range of 3 to 20 c.P.

4. A process as claimed in claim 1, wherein said dye stuff comprises crystal violet.

5. A process as claimed in claim 1, wherein said image configuration formed on said substrate is a mirror image of said original image.

6. A process as claimed in claim 5, wherein said steps of detecting and depositing comprise winding an original sheet having thereon said original image on a first drum, winding said substrate on a second drum, rotating said drums about the respective longitudinal axes thereof, providing relative movement between an original image detector and said first drum in a direction parallel to said longitudinal axis of said first drum while detecting said original image configuration by said detector, and providing relative movement between said ink jet generating unit and said second drum in a direction parallel to said longitudinal axis of said second drum while depositing said ink on said substrate.

7. A process as claimed in claim 5, comprising rotating said first and second drums in opposite directions.

8. A process as claimed in claim 7, comprising moving said detector and said ink jet generating unit in the same direction with respect to the respective said drums.

9. A process as claimed in claim 7, comprising moving said first and second drums in the same direction with respect to said detector and said ink jet generating unit, respectively.

10. A process as claimed in claim 6, comprising rotating said first and second drum in the same direction.

11. A process as claimed in claim 10, comprising moving said detector and said ink jet generating unit is opposite directions with respect to the respective said drums.

12. A process as claimed in claim 10, comprising moving said first and second drums in opposite directions with respect to said detector and said ink jet generating unit, respectively.

* * * * *